United States Patent
Bucher et al.

(10) Patent No.: US 12,266,889 B2
(45) Date of Patent: Apr. 1, 2025

(54) THERMAL TRANSPORT ASSEMBLY FOR A RECEPTACLE ASSEMBLY

(71) Applicants: TE Connectivity Solutions GmbH, Schaffhausen (CH); Tyco Electronics (Shanghai) Co., Ltd., Shanghai (CN)

(72) Inventors: Alan Weir Bucher, Manheim, PA (US); WenYu Liu, Shanghai (CN)

(73) Assignee: TE CONNECTIVITY SOLUTIONS GmbH et al., Schaffhausen (CH)

( * ) Notice: Subject to any disclaimer, the term of this patent is extended or adjusted under 35 U.S.C. 154(b) by 283 days.

(21) Appl. No.: 17/839,553

(22) Filed: Jun. 14, 2022

(65) Prior Publication Data

US 2023/0378686 A1     Nov. 23, 2023

(30) Foreign Application Priority Data

May 23, 2022 (CN) .......................... 202210566955.8

(51) Int. Cl.
  *H01R 13/533*     (2006.01)
(52) U.S. Cl.
  CPC ................................. *H01R 13/533* (2013.01)
(58) Field of Classification Search
  CPC .. H01R 13/533; H01R 13/514; H01R 13/652; H01R 13/6584; H01R 13/6594; H01R 13/65914
  See application file for complete search history.

(56) References Cited

U.S. PATENT DOCUMENTS

| | | | | |
|---|---|---|---|---|
| 7,764,504 | B2 * | 7/2010 | Phillips | H01R 13/6586 |
| | | | | 174/15.2 |
| 8,613,632 | B1 * | 12/2013 | Nichols | H01R 13/6587 |
| | | | | 439/485 |
| 8,890,004 | B2 * | 11/2014 | Wickes | H05K 9/0009 |
| | | | | 174/382 |
| 9,343,851 | B2 | 5/2016 | Bucher et al. | |
| 9,518,785 | B2 * | 12/2016 | Szczesny | G02B 6/4269 |
| 9,547,140 | B2 | 1/2017 | Wu et al. | |
| 9,547,141 | B2 * | 1/2017 | Wu | G02B 6/4277 |
| 9,583,865 | B2 * | 2/2017 | Sharf | H01R 13/506 |
| 9,620,890 | B1 | 4/2017 | Vino, IV et al. | |
| 9,668,378 | B2 | 5/2017 | Phillips | |
| 9,668,379 | B1 | 5/2017 | Bucher | |
| 9,668,380 | B2 | 5/2017 | Bucher | |
| 9,841,772 | B2 | 12/2017 | Bucher | |
| 9,912,107 | B2 | 3/2018 | Bucher | |
| 10,178,804 | B2 * | 1/2019 | Sharf | H01R 12/70 |
| 10,939,594 | B2 * | 3/2021 | Long | H05K 9/0009 |
| 10,993,352 | B2 | 4/2021 | Bucher | |
| 11,011,861 | B1 * | 5/2021 | Briant | H01R 12/721 |

(Continued)

*Primary Examiner* — Thanh Tam T Le

(57) ABSTRACT

A receptacle assembly includes a receptacle cage having a channel separator received in the cavity between the side walls separating the cavity into upper and lower module channels receiving corresponding pluggable modules. The receptable assembly includes a thermal transport assembly coupled to the receptacle cage having an upper cooling module, a lower cooling module and a cold plate at the rear of the receptacle cage. The upper cooling module is located in a top opening of the cage to thermally couple to the upper pluggable module. The lower cooling module is loaded into the separator chamber to thermally coupled to the lower pluggable module plugged into the lower module chamber.

20 Claims, 12 Drawing Sheets

(56) References Cited

U.S. PATENT DOCUMENTS

| | | | |
|---|---|---|---|
| 11,114,797 B2 * | 9/2021 | Wang | G02B 6/4284 |
| 11,355,884 B2 * | 6/2022 | Yang | H01R 13/659 |
| 11,646,528 B2 * | 5/2023 | Li | H01R 13/533 |
| | | | 439/271 |
| 11,848,523 B2 * | 12/2023 | Yang | H01R 13/6585 |
| 2020/0373706 A1 | 11/2020 | Bucher et al. | |
| 2021/0084791 A1 | 3/2021 | Bucher | |
| 2022/0015267 A1 | 1/2022 | Bucher et al. | |

* cited by examiner

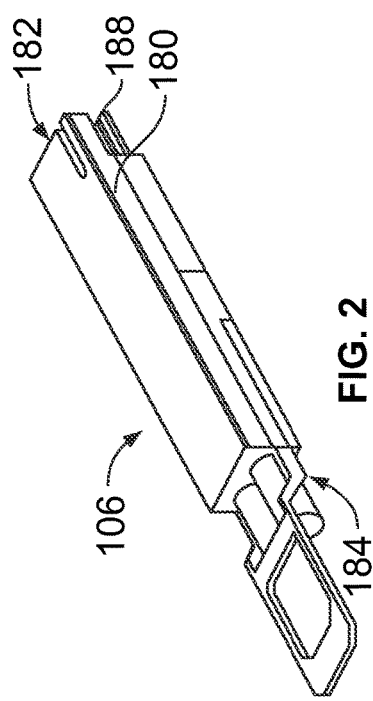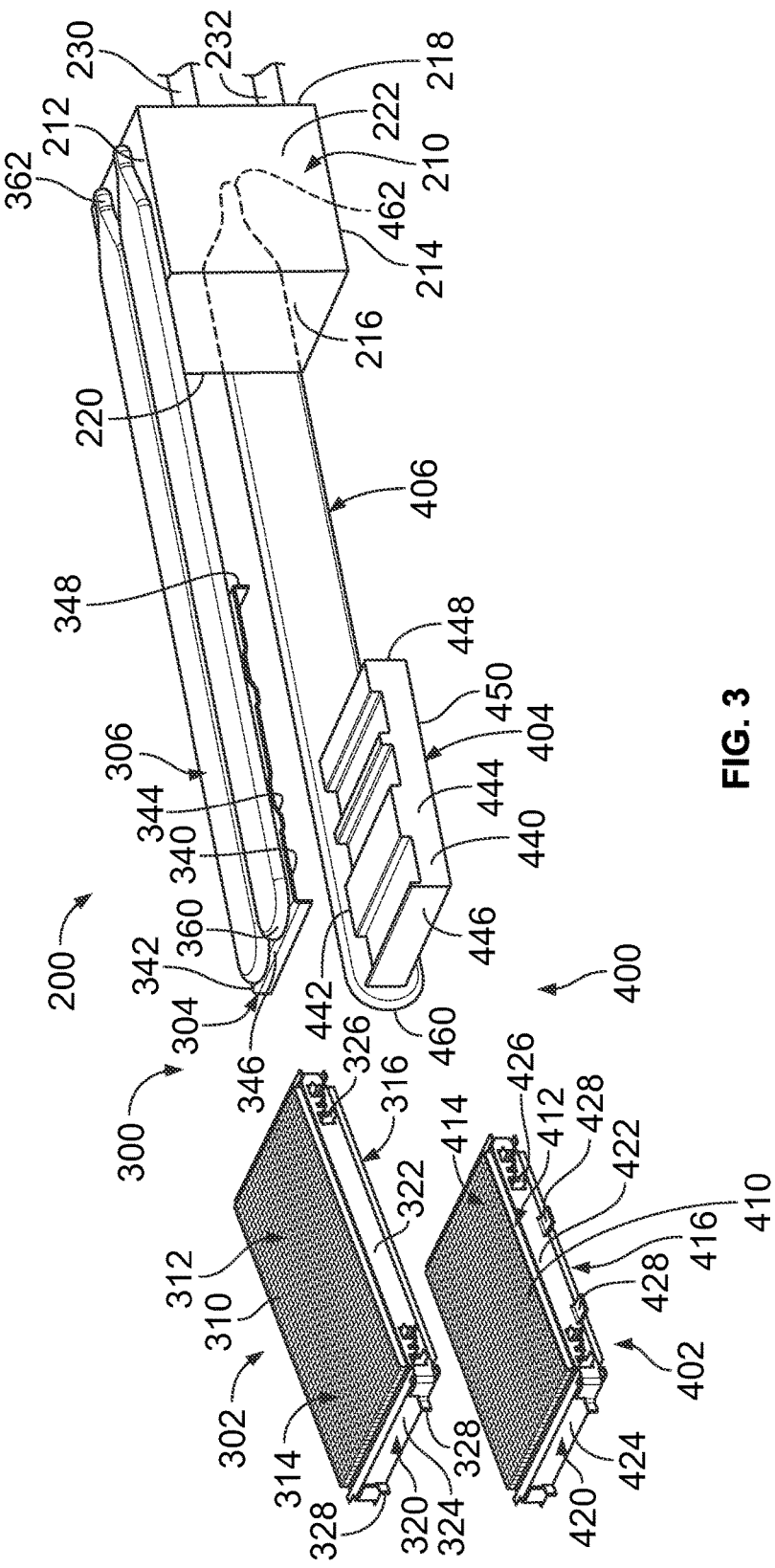

THERMAL TRANSPORT ASSEMBLY FOR A RECEPTACLE ASSEMBLY

CROSS REFERENCE TO RELATED APPLICATIONS

This application claims benefit to Chinese Application No. 202210566955.8, filed 23 May 2022, the subject matter of which is herein incorporated by reference in its entirety.

BACKGROUND OF THE INVENTION

The subject matter herein relates generally to electrical connector assemblies.

It may be desirable to transfer thermal energy (or heat) away from designated components of a system or device. For example, electrical connectors may be used to transmit data and/or electrical power to and from different systems or devices. One type of electrical connector assembly uses pluggable modules received in a receptacle assembly. Data signals may be transmitted through the communication cable(s) in the form of optical signals and/or electrical signals.

A common challenge that confronts developers of electrical systems is heat management. Thermal energy generated by internal electronics within a system can degrade performance or even damage components of the system. To dissipate the thermal energy, systems include a thermal component, such as a heat sink, which engages the heat source, absorbs the thermal energy from the heat source, and transfers the thermal energy away. Conventional electrical systems use heat sinks with heat dissipating fins. Air flows over the heat dissipating fins to dissipate the heat from the heat sink. There are limits to the amount of heat that is able to be dissipated by conventional heat sinks. Additionally, there are typically space constraints around electrical systems which limit the sizes of the heat sinks. Furthermore, in stacked systems, cooling of the lower pluggable modules is difficult due to constraints on cooling the interior of the receptacle assembly.

Accordingly, there is a need for a thermal transfer assembly that transfers thermal energy away from electrical components, such as pluggable modules.

BRIEF DESCRIPTION OF THE INVENTION

In one embodiment, a receptacle assembly is provided and includes a receptacle cage including cage walls forming a cavity. The cage walls include a top wall, a first side wall, and a second side wall. The receptacle cage extends between a front and a rear. The receptacle cage includes a channel separator received in the cavity between the first and second side walls. The channel separator includes an upper separator wall and a lower separator wall with a separator chamber between the upper and lower separator walls. The channel separator separates the cavity into an upper module channel configured to receive an upper pluggable module and a lower module channel configured to receive a lower pluggable module. The top wall includes a top opening providing access to the upper module channel. The lower separator wall includes a lower opening providing access to the lower module channel. The first side wall includes a side opening aligned with the separator chamber. The receptable assembly includes a thermal transport assembly coupled to the receptacle cage. The thermal transport assembly includes an upper cooling module, a lower cooling module and a cold plate at the rear of the receptacle cage. The upper cooling module is located in the top opening. The upper cooling module is thermally coupled to the cold plate and configured to be thermally coupled to the upper pluggable module plugged into the upper module chamber. The lower cooling module is located in the separator chamber. The lower cooling module is loaded into the separator chamber. The lower cooling module is thermally coupled to the cold plate and configured to be thermally coupled to the lower pluggable module plugged into the lower module chamber.

In another embodiment, a receptacle assembly is provided and includes a receptacle cage including cage walls forming a cavity. The cage walls include a top wall, a first side wall, and a second side wall. The receptacle cage extends between a front and a rear. The receptacle cage includes a channel separator received in the cavity between the first and second side walls. The channel separator includes an upper separator wall and a lower separator wall with a separator chamber between the upper and lower separator walls. The channel separator separating the cavity into an upper module channel configured to receive an upper pluggable module and a lower module channel configured to receive a lower pluggable module. The top wall includes a top opening providing access to the upper module channel. The lower separator wall includes a lower opening providing access to the lower module channel. The first side wall includes a side opening aligned with the separator chamber. The receptable assembly includes a thermal transport assembly coupled to the receptacle cage. The thermal transport assembly includes an upper cooling module, a lower cooling module and a cold plate at the rear of the receptacle cage. The upper cooling module includes an upper thermal bridge, an upper heat spreader, and an upper heat pipe. The upper thermal bridge includes an upper interface and a lower interface. The lower interface of the upper thermal bridge configured to face and thermally couple to the pluggable module. The upper heat spreader is thermally coupled to the upper interface of the upper thermal bridge. The upper heat pipe is thermally coupled between the upper heat spreader and the cold plate to dissipate heat from the upper heat spreader to the cold plate. The upper thermal bridge is located in the top opening to interface with the upper pluggable module in the upper module chamber. The lower cooling module includes a lower thermal bridge, a lower heat spreader, and a lower heat pipe. The lower thermal bridge includes an upper interface and a lower interface. The lower interface of the lower thermal bridge is configured to face and thermally couple to the pluggable module. The lower heat spreader is thermally coupled to the upper interface of the lower thermal bridge. The lower heat pipe is thermally coupled between the lower heat spreader and the cold plate to dissipate heat from the lower heat spreader to the cold plate. The lower thermal bridge is located in the separator chamber to interface with the lower pluggable module in the lower module chamber. The lower heat spreader passes through the side opening to the separator chamber to interface with the lower thermal bridge.

In a further embodiment, a receptacle assembly is provided and includes a receptacle cage including cage walls forming a cavity. The cage walls include a top wall, a first side wall, and a second side wall. The receptacle cage extends between a front and a rear. The receptacle cage includes a channel separator received in the cavity between the first and second side walls. The channel separator includes an upper separator wall and a lower separator wall with a separator chamber between the upper and lower separator walls. The channel separator separates the cavity into an upper module channel configured to receive an upper pluggable module and a lower module channel configured to receive a lower pluggable module. The receptacle assembly includes a thermal transport assembly coupled to the receptacle cage. The thermal transport assembly includes an upper cooling module, a lower cooling module and a cold plate at the rear of the receptacle cage. The upper cooling module is thermally coupled to the cold plate and configured to be thermally coupled to the upper pluggable module plugged into the upper module chamber. The lower cooling module extends into the separator chamber. The lower cooling module is thermally coupled to the cold plate. The receptacle assembly includes a lower compressor coupled to the receptacle cage. The lower compressor engages the lower cooling module and presses downward on the lower cooling module to compress the lower cooling module into thermal engagement with the lower pluggable module plugged into the lower module chamber.

BRIEF DESCRIPTION OF THE DRAWINGS

FIG. 2 is a rear perspective view of the pluggable module in accordance with an exemplary embodiment.

FIG. 3 is an exploded view of the thermal transport assembly in accordance with an exemplary embodiment.

DETAILED DESCRIPTION OF THE INVENTION

Figure 1:
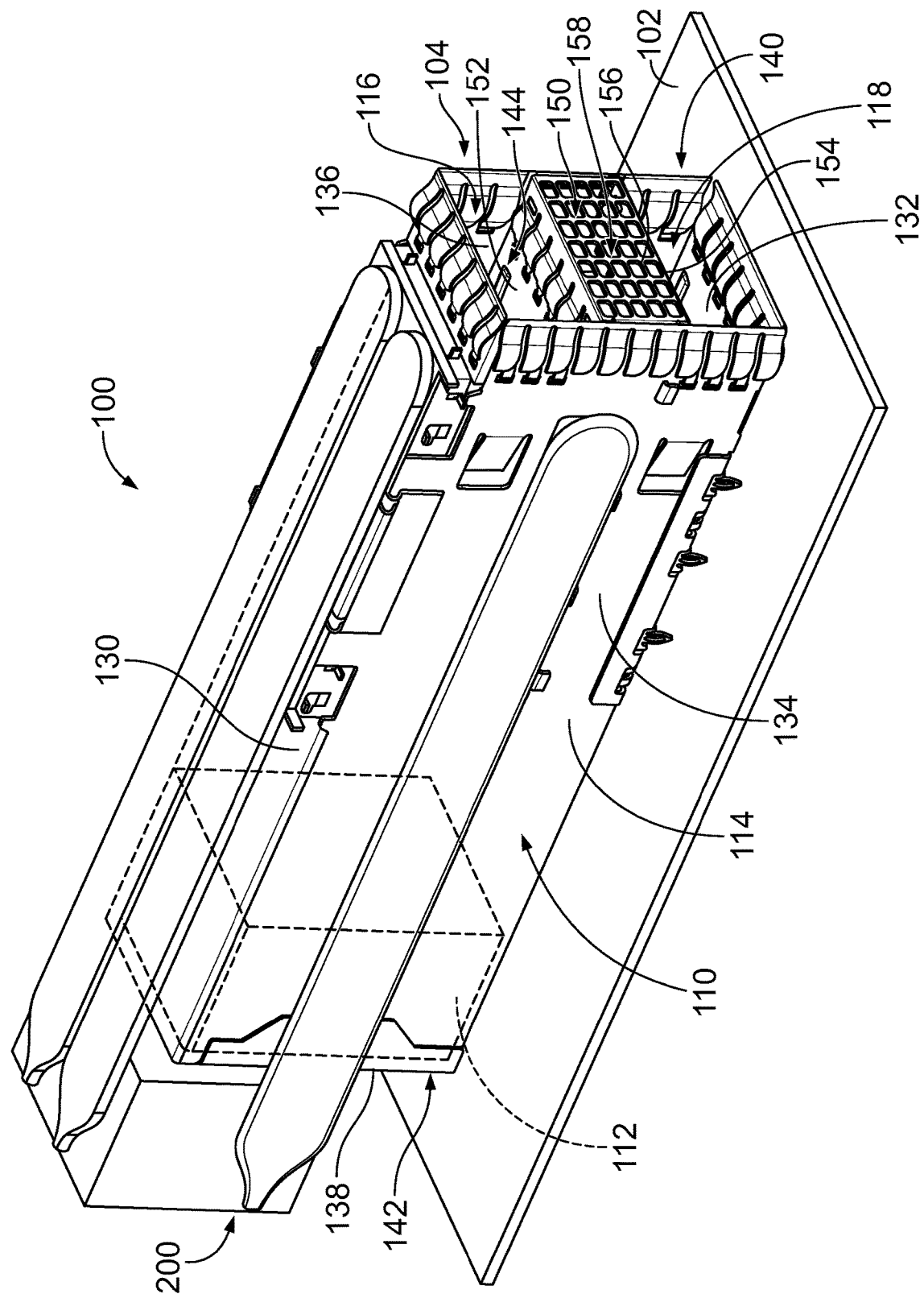
FIG. 1 is a front perspective view of an electrical connector assembly formed in accordance with an exemplary embodiment.

FIG. 1 is a front perspective view of an electrical connector assembly 100 formed in accordance with an exemplary embodiment. The electrical connector assembly 100 includes a host circuit board 102 and a receptacle assembly 104 mounted to the circuit board 102. In an exemplary embodiment, the receptacle assembly 104 includes a thermal transport assembly 200 used to dissipate heat from components of the electrical connector assembly 100.

The receptacle assembly 104 is configured to receive pluggable modules 106 (shown in FIG. 2), such as an upper pluggable module and a lower pluggable module. The pluggable modules 106 are electrically connected to the circuit board 102 through the receptacle assembly 104. The thermal transport assembly 200 is used to dissipate heat from the pluggable modules 106 when plugged into the receptacle assembly 104.

In an exemplary embodiment, the receptacle assembly 104 includes a receptacle cage 110 and a communication connector 112 (shown in phantom) adjacent the receptacle cage 110. For example, in the illustrated embodiment, the communication connector 112 is received in the receptacle cage 110. In other various embodiments, the communication connector 112 may be located rearward of the receptacle cage 110. The communication connector 112 is electrically connected to the host circuit board 102.

In various embodiments, the receptacle cage 110 is enclosed and provides electrical shielding for the communication connector 112. The pluggable modules 106 are configured to be loaded into the receptacle cage 110 and surrounded by the receptacle cage 110. The receptacle cage 110 includes a plurality of cage walls 114 that define one or more module channels for receipt of corresponding pluggable modules 106. The cage walls 114 may be walls defined by solid sheets, perforated walls to allow airflow therethrough, walls with cutouts, such as for portions of the thermal transport assembly 200 to pass therethrough, or walls defined by rails or beams with relatively large openings, such as for airflow therethrough. In an exemplary embodiment, the receptacle cage 110 is a shielding, stamped and formed cage member with the cage walls 114 being shielding walls.

In the illustrated embodiment, the receptacle cage 110 constitutes a stacked cage member having an upper module channel 116 and a lower module channel 118. The receptacle assembly 104 is configured to mate with the pluggable modules 106 in both stacked module channels 116, 118. The receptacle cage 110 has module ports that open to the module channels 116, 118, respectively, which receive corresponding upper and lower pluggable modules 106. The thermal transport assembly 200 is configured to interface with both the upper and lower pluggable modules 106 to dissipate heat from the upper and lower pluggable modules 106. Any number of module channels may be provided in various embodiments. In the illustrated embodiment, the receptacle cage 110 includes the upper and lower module channels 116, 118 arranged in a single column; however, the receptacle cage 110 may include multiple columns of ganged module channels 116, 118 in alternative embodiments. Optionally, multiple communication connectors 112 may be arranged within the receptacle cage 110, such as when multiple columns of module channels 116 and/or 118 are provided. In other various embodiments, the receptacle cage 110 may include a single module channel 116 or a single row of module channels 116 rather than being a stacked receptacle cage.

In an exemplary embodiment, the cage walls 114 of the receptacle cage 110 include a top wall 130, a bottom wall 132, a first side wall 134, a second side wall 136, and a rear wall 138. The bottom wall 132 may rest on or near the host circuit board 102. However, in alternative embodiments, the receptacle cage 110 may be provided without the bottom wall 132. The receptacle cage 110 extends between a front end 140 and a rear end 142. The module ports are provided at the front end 140 and receive the pluggable modules 106 through the front end 140. The cage walls 114 define a cavity 144. For example, the cavity 144 may be defined by the top wall 130, the bottom wall 132, the side walls 134, 136 and the rear wall 138. In an exemplary embodiment, the thermal transport assembly 200 is coupled to the cage walls 114, such as the top wall 130 and/or the first side wall 134 and/or the second side wall 136 and/or the rear wall 138.

In an exemplary embodiment, the receptacle cage 110 includes a port separator 150 received in the cavity 144. The port separator 150 separates or divides the cavity 144 into the upper and lower module channels 116, 118. The port separator 150 forms a space between the upper and lower module channels 116, 118, such as for receiving a portion of the thermal transport assembly 200. The port separator 150 includes an upper separator wall 152, a lower separator wall 154 and a front separator wall 156. The port separator 150 includes a separator chamber 158 between the upper and lower separator walls 152, 154. The separator chamber 158 is rearward of the front wall 156. The front separator wall 156 may include openings to allow airflow through the separator chamber 158. The separator chamber 158 is configured to receive a portion of the thermal transport assembly 200, such as for cooling the lower pluggable module 106 in the lower module channel 118.

The communication connector 112 is coupled to the circuit board 102. The receptacle cage 110 is mounted to the circuit board 102 over the communication connector 112. In an exemplary embodiment, the communication connector 112 is received in the cavity 144, such as proximate to the rear wall 138. However, in alternative embodiments, the communication connector 112 may be located behind the rear wall 138 exterior of the receptacle cage 110 and extend into the cavity 144 to interface with the pluggable module(s) 106. For example, the rear wall 138 may include an opening to receive components therethrough. In an exemplary embodiment, a single communication connector 112 is used to electrically connect with the pair of stacked pluggable modules 106 in the upper and lower module channels 116, 118. In alternative embodiments, the electrical connector assembly 100 may include discrete, stacked communication connectors 112 (for example, an upper communication connector and a lower communication connector) for mating with the corresponding pluggable modules 106.

In an exemplary embodiment, the pluggable modules 106 are loaded into the receptacle cage 110 through the front end 140 to mate with the communication connector 112. The shielding cage walls 114 of the receptacle cage 110 provide electrical shielding around the communication connector 112 and the pluggable modules 106, such as around the mating interfaces between the communication connector 112 and the pluggable modules 106. Gaskets may be provided at the front end 140 surrounding the module ports to interface with the pluggable modules 106 when the pluggable modules 106 are plugged into the upper and lower module channels 116, 118.

FIG. 2 is a rear perspective view of the pluggable module 106 in accordance with an exemplary embodiment. The pluggable module 106 has a pluggable body 180, which may be defined by one or more shells. The pluggable body 180 includes sides, a top, and a bottom. The pluggable body 180 may be thermally conductive and/or may be electrically conductive, such as to provide EMI shielding for the pluggable module 106. The pluggable body 180 includes a mating end 182 and an opposite front end 184. The front end 184 may be a cable end having a cable extending therefrom to another component within the system. The mating end 182 is configured to be inserted into the corresponding module channel 116 or 118 (shown in FIG. 1).

The pluggable module 106 includes a module circuit board 188 that is configured to be communicatively coupled to the communication connector 112 (shown in FIG. 1). The module circuit board 188 may be accessible at the mating end 182. The module circuit board 188 may include components, circuits and the like used for operating and/or using the pluggable module 106. For example, the module circuit board 188 may have conductors, traces, pads, electronics, sensors, controllers, switches, inputs, outputs, and the like associated with the module circuit board 188, which may be mounted to the module circuit board 188, to form various circuits.

In an exemplary embodiment, the pluggable body 180 provides heat transfer for the module circuit board 188, such as for the electronic components on the module circuit board 188. For example, the module circuit board 188 is in thermal communication with the pluggable body 180 and the pluggable body 180 transfers heat from the module circuit board 188. In an exemplary embodiment, the pluggable body 180 includes a thermal interface along the top for interface with the thermal transport assembly 200 (shown in FIG. 1).

FIG. 3 is an exploded view of the thermal transport assembly 200 in accordance with an exemplary embodiment. The thermal transport assembly 200 includes an upper cooling module 300, a lower cooling module 400, and a cold plate 210. The upper cooling module 300 is used for cooling the upper pluggable module 106 (FIG. 2) received in the upper module channel 116 (FIG. 1). The lower cooling module 400 is used for cooling the lower pluggable module 106 (FIG. 2) received in the lower module channel 118 (FIG. 1). The cold plate 210 is used to dissipate the heat from the system. An adaptor component of the cold plate 210 is illustrated in FIG. 3, which may be connected to one or more other cold plate elements of the heat dissipation system.

In an exemplary embodiment, some of the components of the upper cooling module 300 and some of the components of the lower cooling module 400 are configured to be located within the interior cavity 144 of the receptacle cage 110 (FIG. 1), while some of the components of the upper cooling module 300 and some of the components of the lower cooling module 400 are configured to be located along the exterior of the receptacle cage 110. In an exemplary embodiment, some of the components of the upper cooling module 300 and some of the components of the lower cooling module 400 are configured to be coupled to the receptacle cage 110, while some of the components of the upper cooling module 300 and some of the components of the lower cooling module 400 are removably coupled to other components to allow ease of assembly. Optionally, the components of the cooling modules 300, 400 may float relative to the receptacle cage 110 to allow relative movement therebetween.

The cold plate 210 is thermally conductive. For example, the cold plate 210 may be manufactured from a metal material, such as aluminum or copper. In the illustrated embodiment, the cold plate 210 is blocked is shaped having a top 212, a bottom 214, a front 216, a rear 218, a first side 220, and a second side 222. However, the cold plate 210 may have other shapes in alternative embodiments.

In an exemplary embodiment, the cold plate 210 is configured to be liquid cooled by a coolant for efficient heat dissipation. The cold plate 210 is located at the rear of the thermal transport assembly 200 and is configured to be located rearward of the receptacle cage 110 (FIG. 1). The cold plate 210 may include internal cooling tubes or channels to allow liquid coolant to flow through the cold plate 210. A coolant supply 230 is coupled to the cold plate 210. A coolant return 232 is coupled to the cold plate 210. Coolant flows from the coolant supply 230, through the cold plate 210, to the coolant return 232.

The upper cooling module 300 includes an upper thermal bridge 302, an upper heat spreader 304, and an upper heat pipe 306. The upper thermal bridge 302 is configured to be thermally coupled to the upper pluggable module 106. The upper heat spreader 304 is configured to be thermally coupled to the upper thermal bridge 302. The upper heat pipe 306 is configured to thermally couple the upper heat spreader 304 and the cold plate 210.

The upper thermal bridge 302 includes a plurality of upper plates 310 arranged in an upper plate stack 312. The upper plates 310 are movable relative to each other. For example, the upper plates 310 may slide up and down relative to each other. The upper plate stack 312 has an upper interface 314 and a lower interface 316. The interfaces 314, 316 have large surface areas for efficient heat transfer between the upper pluggable module 106 and the upper heat spreader 304. The interfaces 314, 316 are conformable, such as for conforming to the pluggable module 106 and the upper heat spreader 304. For example, the upper plates 310 along the upper interface 314 may be compressed inward or downward during mating with the upper heat spreader 304 and the upper plates 310 along the lower interface 316 may be compressed inward or upward during mating with the upper pluggable module 106. The upper thermal bridge 302 has large surface areas along the upper and lower interfaces 314, 316 to efficiently transfer heat between the pluggable module 106 and the upper heat spreader 304.

The upper plates 310 are held together by a frame 320 including frame side walls 322 and frame end walls 324. The walls of the frame 320 may be stamped and formed elements. In an exemplary embodiment, biasing members 326, such as spring elements, extend through the interior of the upper plate stack 312. The biasing members 326 may be coupled to the frame 320, such as the frame side walls 322, and pass through the interior of the upper thermal bridge 302, such as between various upper plates 310. The biasing members 326 engage the upper plates 310 and press the upper plates 310 outward by spring forces. For example, the biasing members 326 may press some of the upper plates 310 upward and may press some of the upper plates 310 downward thus spreading the various upper plates 310 apart. The frame 320 confines the upper plates 310 to restrict the upper plates 310 from spreading too far apart. The outward spring forces of the biasing members 326 may be overcome during mating to compress the upper and/or lower interface 314, 316. For example, the height of the upper plate stack 312 may change when mated to the upper pluggable module 106 (for example, the upper plate stack 312 may be compressed between the upper heat spreader 304 and the upper pluggable module 106). In an exemplary embodiment, the frame 320 includes mounting tabs 328 that are used to locate the upper thermal bridge 302 with respect to the receptacle cage 110. For example, the mounting tabs 328 may locate the frame 320 relative to the receptacle cage 110 while still allowing the upper plates 310 to move relative to the frame 320, such as to compress during mating with the upper pluggable module 106.

The upper heat spreader 304 includes a main body 340 having sides 342, 344 extending between a front 346 and a rear 348. In various embodiments, the main body 340 may be a plate having a relatively narrow thickness. In an exemplary embodiment, the main body 340 is stamped and formed from a sheet of metal. The main body 340 may include a front lip 350 at the front 346 and a rear lip 352 at the rear 348. The front and rear lips 350, 352 are bent perpendicular relative to the main body 340, such as being bent downward. A space 354 is defined between the front and rear lips 350, 352 below the main body 340. The space 354 receives the upper thermal bridge 302. A bottom of the main body 340 is configured to be thermally coupled to the upper interface 314 of the upper thermal bridge 302. The bottom of the main body 340 may directly engage the upper plates 310 of the upper thermal bridge 302 for direct thermal transfer between the upper thermal bridge 302 and the upper heat spreader 304. In other embodiments, a thermal grease may be applied to the upper interface 314 of the upper thermal bridge 302 and/or the bottom of the main body 340 to create a thermal interface material layer between the upper thermal bridge 302 and the upper heat spreader 304 and enhance heat transfer at the interface between the upper thermal bridge 302 and the upper heat spreader 304. The upper heat spreader 304 efficiently dissipates heat from the upper thermal bridge 302. The upper heat spreader 304 has a length between the front 346 and the rear 348. The length may be approximately equal to the length of the upper thermal bridge 302. The upper heat spreader 304 has a width between sides 342, 344. The width may be approximately equal to a width of the upper thermal bridge 302.

In an exemplary embodiment, the upper cooling module 300 includes a plurality of the upper heat pipes 306. However, a single upper heat pipe 306 may be used in alternative embodiments. The upper heat pipe 306 extends between the upper heat spreader 304 and the cold plate 210. The upper heat pipe 306 is manufactured from a thermally conductive material, such as aluminum or copper. In various embodiments, the upper heat pipe 306 may be a solid piece. Alternatively, the upper heat pipe 306 may be hollow, such as forming a closed evaporation/condensation loop. The upper heat pipe 306 extends between a front end 360 and a rear end 362. The front end 360 is coupled to the upper heat spreader 304. The rear end 362 is coupled to the cold plate 210. Optionally, the upper heat pipe 306 may be soldered, welded, or connected by thermal epoxy to the cold plate 210 and/or the upper heat spreader 304. As such, the heat pipe 306 is used to fix the positions of the upper heat spreader 304 relative to the cold plate 210. In an exemplary embodiment, an interior surface 364 of the upper heat pipe 306 extends along and is thermally coupled to the top of the main body 340 of the upper heat spreader 304. In the illustrated embodiment, the interior surface 364 is a bottom surface of the upper heat pipe 306. The upper heat pipe 306 has a large surface area in thermal contact with the upper heat spreader 304. In an exemplary embodiment, the interior surface 364 of the upper heat pipe 306 extends along and is thermally coupled to the top 212 of the cold plate 210. The upper heat pipe 306 has a large surface area in thermal contact with the cold plate 210. The upper heat pipe 306 may be coupled to a different portion of the cold plate 210. For example, the upper heat pipe 306 may extend into an interior pocket of the cold plate 210 such that both the interior surface 364 and an exterior surface 366 (for example, top surface) of the upper heat pipe 306 are thermally coupled to the cold plate 210. The upper heat pipe 306 efficiently transfers heat from the upper heat spreader 304 to the cold plate 210.

The lower cooling module 400 includes a lower thermal bridge 402, a lower heat spreader 404, and a lower heat pipe 406. The lower thermal bridge 402 is configured to be thermally coupled to the lower pluggable module 106. The lower heat spreader 404 is configured to be thermally coupled to the lower thermal bridge 402. The lower heat pipe 406 is configured to thermally couple the lower heat spreader 404 and the cold plate 210.

The lower thermal bridge 402 includes a plurality of lower plates 410 arranged in a lower plate stack 412. The lower plates 410 are movable relative to each other. For example, the lower plates 410 may slide up and down relative to each other. The lower plate stack 412 has an upper interface 414 and a lower interface 416. The interfaces 414, 416 have large surface areas for efficient heat transfer between the lower pluggable module 106 and the lower heat spreader 404. The interfaces 414, 416 are conformable, such as for conforming to the pluggable module 106 and the lower heat spreader 404. For example, the lower plates 410 along the upper interface 414 may be compressed inward or downward during mating with the lower heat spreader 404 and the lower plates 410 along the lower interface 416 may be compressed inward or upward during mating with the lower pluggable module 106. The lower thermal bridge 402 has large surface areas along the upper and lower interfaces 414, 416 to efficiently transfer heat between the pluggable module 106 and the lower heat spreader 404.

The lower plates 410 are held together by a frame 420 including frame side walls 422 and frame end walls 424. The walls of the frame 420 may be stamped and formed elements. In an exemplary embodiment, biasing members 426, such as spring elements, extend through the interior of the lower plate stack 412. The biasing members 426 may be coupled to the frame 420, such as the frame side walls 422, and pass through the interior of the lower thermal bridge 402, such as between various lower plates 410. The biasing members 426 engage the lower plates 410 and press the lower plates 410 outward by spring forces. For example, the biasing members 426 may press some of the lower plates 410 upward and may press some of the lower plates 410 downward thus spreading the various lower plates 410 apart. The frame 420 confines the lower plates 410 to restrict the lower plates 410 from spreading too far apart. The outward spring forces of the biasing members 426 may be overcome during mating to compress the upper and/or lower interface 414, 416. For example, the height of the lower plate stack 412 may change when mated to the lower pluggable module 106 (for example, the lower plate stack 412 may be compressed between the lower heat spreader 404 and the lower pluggable module 106). In an exemplary embodiment, the frame 420 includes mounting tabs 428 that are used to mount and fix the lower thermal bridge 402 to the receptacle cage 110. For example, the mounting tabs 428 may secure the frame 420 relative to the receptacle cage 110 while still allowing the lower plates 410 to move relative to the frame 420, such as to compress during mating with the lower pluggable module 106.

The lower heat spreader 404 includes a main body 440 having sides 442, 444 extending between a front 446 and a rear 448. In various embodiments, the main body 440 may be a plate or block sized to fit in the separator chamber 158 (FIG. 1). In an exemplary embodiment, the main body 440 is die cast or milled from a metal material. A bottom 450 of the main body 440 is configured to be thermally coupled to the upper interface 414 of the lower thermal bridge 402. The bottom 450 of the main body 440 may directly engage the lower plates 410 of the lower thermal bridge 402 for direct thermal transfer between the lower thermal bridge 402 and the lower heat spreader 404. In other embodiments, a thermal grease may be applied to the upper interface 414 of the lower thermal bridge 402 and/or the bottom 450 of the main body 440 to create a thermal interface material layer between the lower thermal bridge 402 and the lower heat spreader 404 and enhance heat transfer at the interface between the lower thermal bridge 402 and the lower heat spreader 404. The lower heat spreader 404 efficiently dissipates heat from the lower thermal bridge 402. The lower heat spreader 404 has a length between the front 446 and the rear 448. The length may be approximately equal to the length of the lower thermal bridge 402. The lower heat spreader 404 has a width between the sides 442, 444. The width may be approximately equal to a width of the lower thermal bridge 402.

In an exemplary embodiment, the lower cooling module 400 includes a single lower heat pipe 406. However, multiple lower heat pipes 406 may be used in alternative embodiments. The lower heat pipe 406 extends between the lower heat spreader 404 and the cold plate 210. The lower heat pipe 406 is manufactured from a thermally conductive material, such as aluminum or copper. In various embodiments, the lower heat pipe 406 may be a solid piece. Alternatively, the lower heat pipe 406 may be hollow. The lower heat pipe 406 extends between a front end 460 and a rear end 462. The front end 460 is coupled to the lower heat spreader 404. The rear end 462 is coupled to the cold plate 210. Optionally, the lower heat pipe 406 may be soldered, welded, or connected by thermal epoxy to the cold plate 210 and/or the lower heat spreader 404. As such, the heat pipe 406 is used to fix the positions of the lower heat spreader 404 relative to the cold plate 210. In an exemplary embodiment, an interior surface 464 of the lower heat pipe 406 extends along and is thermally coupled to the first side 442 of the main body 440 of the lower heat spreader 404. The lower heat pipe 406 has a large surface area in thermal contact with the lower heat spreader 404. In an exemplary embodiment, the interior surface 464 of the lower heat pipe 406 extends along and is thermally coupled to the side 220 of the cold plate 210. The lower heat pipe 406 has a large surface area in thermal contact with the cold plate 210. The lower heat pipe 406 may be coupled to a different portion of the cold plate 210. For example, the lower heat pipe 406 may extend into an interior pocket of the cold plate 210 such that both the interior surface 464 and an exterior surface 466 (for example, top surface) of the lower heat pipe 406 are thermally coupled to the cold plate 210. The lower heat pipe 406 efficiently transfers heat from the lower heat spreader 404 to the cold plate 210.

Figure 4:
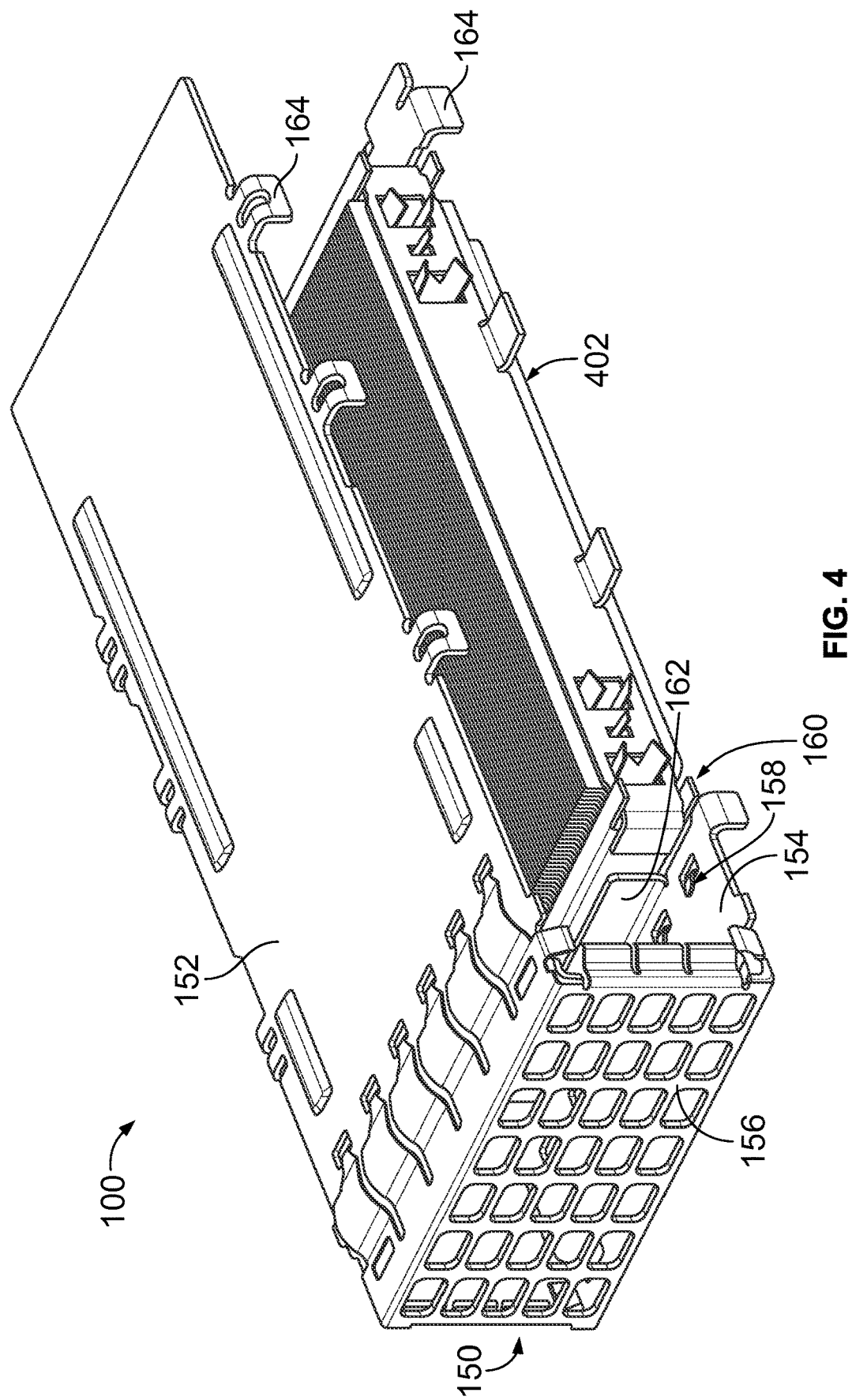
FIG. 4 is a perspective view of a portion of the electrical connector assembly showing the lower thermal bridge positioned relative to the port separator in accordance with an exemplary embodiment.

FIG. 4 is a perspective view of a portion of the electrical connector assembly 100 showing the lower thermal bridge 402 positioned relative to the port separator 150. The lower thermal bridge 402 is received in the separator chamber 158.

In an exemplary embodiment, the lower separator wall 154 includes a lower opening 160 that provides access to the lower module channel 118 (FIG. 1) from the separator chamber 158. The lower thermal bridge 402 is received in the lower opening 160. The lower thermal bridge 402 passes through the lower separator wall 154 to interface with the lower pluggable module 106 when the lower pluggable module 106 is received in the lower module channel 118. In an exemplary embodiment, the lower separator wall 154 includes one or more support walls 162 that support the lower thermal bridge 402 relative to the lower separator wall 154. The support walls 162 may support the lower thermal bridge 402 horizontally and/or vertically relative to the lower separator wall 154. Space is provided in the separator chamber 158 above the lower thermal bridge 402 to receive the lower heat spreader 404.

In an exemplary embodiment, the port separator 150 includes mounting tabs 164 used to mount the port separator 150 to the receptacle cage 110 (FIG. 1). For example, the mounting tabs 164 may extend from the upper separator wall 152 and/or the lower separator wall 154. The mounting tabs 164 extend from the edges along the sides of the separator walls 152, 154. The mounting tabs 164 may be bent downward to form hooks or clips that may be secured to the corresponding cage walls 114. Other types of mounting features may be used in alternative embodiments.

Figure 5:
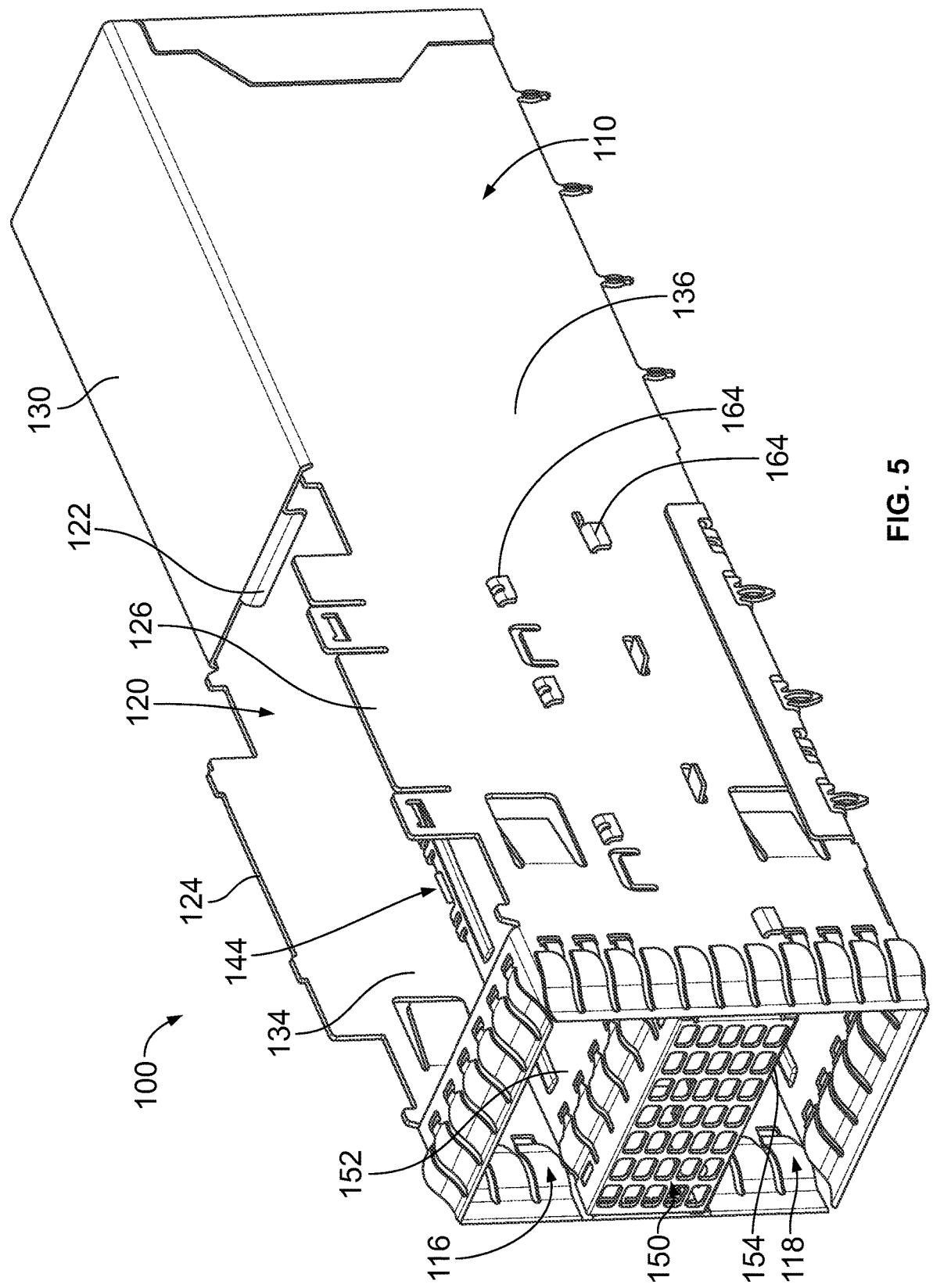
FIG. 5 is a front perspective view of a portion of the electrical connector assembly in accordance with an exemplary embodiment showing the port separator coupled to the receptacle cage.

FIG. 5 is a front perspective view of a portion of the electrical connector assembly 100 in accordance with an exemplary embodiment showing the port separator 150 coupled to the receptacle cage 110. The port separator 150 is received in the cavity 144 approximately centered between the top and the bottom of the receptacle cage 110. The port separator 150 separates the cavity 144 into the upper module channel 116 and the lower module channel 118. The mounting tabs 164 are used to secure the port separator 150 to the receptacle cage 110. For example, the mounting tabs 164 extend through slots or openings in the first and second side walls 134, 136 to secure the upper and lower separator walls 152, 154 to the side walls 134, 136. The mounting tabs 164 may be welded to the side walls 134, 136 in various embodiments.

In an exemplary embodiment, the receptacle cage 110 includes a top opening 120 in the top wall 130. The top opening 120 is configured to receive a portion of the thermal transport assembly 200 (FIG. 1). The top opening 120 provides access to the upper module channel 116 to allow the thermal transport assembly 200 to be thermally coupled to the pluggable module received in the upper module channel 116. In the illustrated embodiment, the top opening 120 extends the entire width of the receptacle cage 110 between the side walls 134, 136. In an exemplary embodiment, the top wall 130 includes one or more support walls 122 used to support the components of the thermal transport assembly 200 relative to the receptacle cage 110 or to limit the insertion distance of the pluggable module. In an exemplary embodiment, the side walls 134, 136 include support walls 124, 126 used to support the components of the thermal transport assembly 200 relative to the receptacle cage 110.

Figure 6:
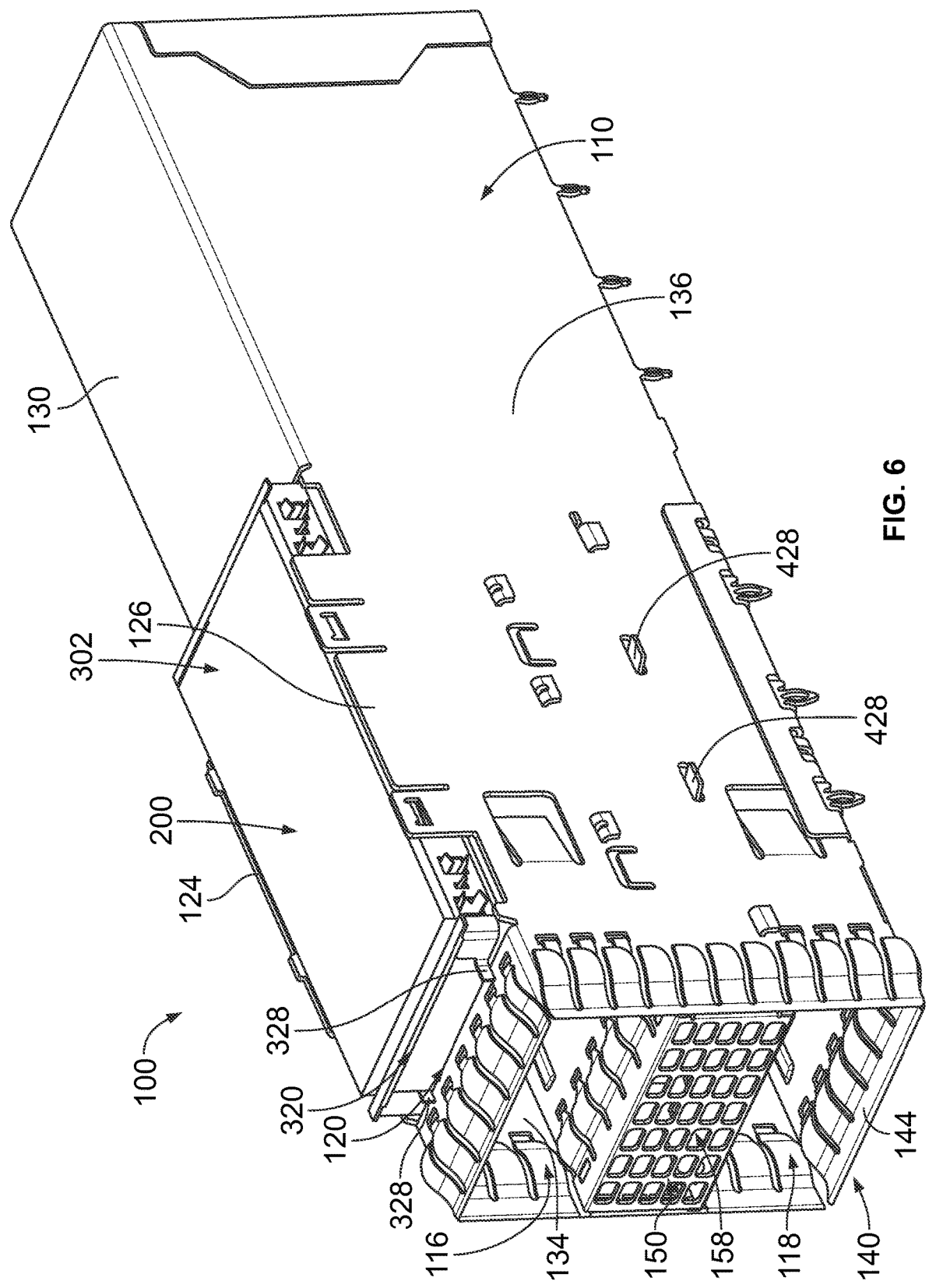
FIG. 6 is a front perspective, right hand view of a portion of the electrical connector assembly in accordance with an exemplary embodiment showing the thermal bridges coupled to the receptacle cage.
Figure 7:
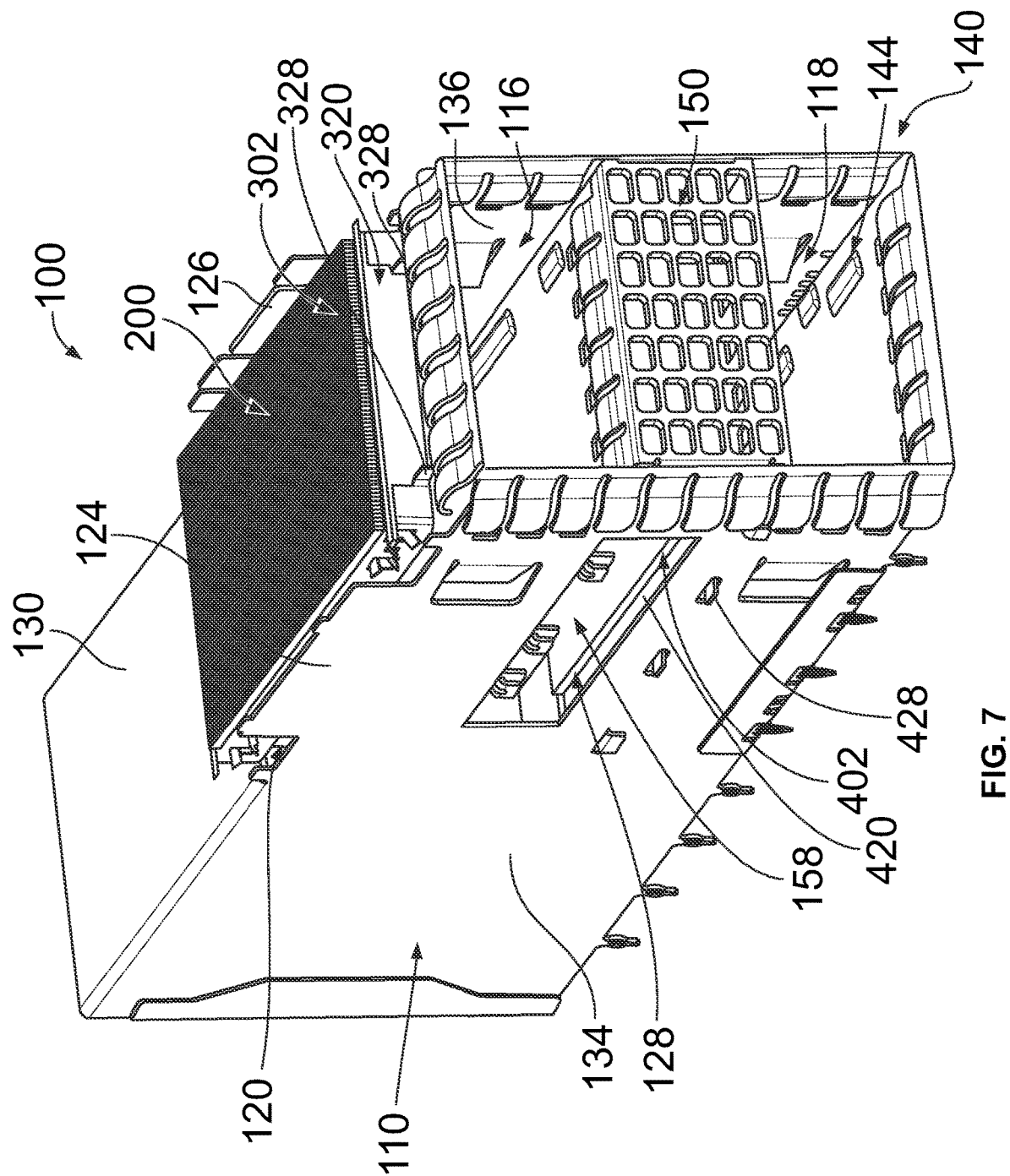
FIG. 7 is a front perspective, left hand view of a portion of the electrical connector assembly in accordance with an exemplary embodiment showing the thermal bridges coupled to the receptacle cage.

FIG. 6 is a front perspective, right hand view of a portion of the electrical connector assembly 100 in accordance with an exemplary embodiment showing the thermal bridges 302, 402 coupled to the receptacle cage 110. FIG. 7 is a front perspective, left hand view of a portion of the electrical connector assembly 100 in accordance with an exemplary embodiment showing the thermal bridges 302, 402 coupled to the receptacle cage 110.

The upper thermal bridge 302 is received in the top opening 120. In an exemplary embodiment, a portion of the upper thermal bridge 302 extends through the top opening 120 into the upper module channel 116 to interface with the pluggable module 106 plugged into the upper module channel 116. The mounting tabs 328 of the frame 320 of the upper thermal bridge 302 are used to mount the upper thermal bridge 302 to the receptacle cage 110. For example, the mounting tabs 328 may be mounted to the top wall 130. The support walls 122, 124, 126 of the receptacle cage 110 may be used to support and/or position the upper thermal bridge 302 relative to the receptacle cage 110. When assembled, the upper thermal bridge 302 floats relative to the receptacle cage 110.

The lower thermal bridge 402, which is coupled to the port separator 150 and located in the separator chamber 158, is received in the cavity 144. The bottom of the lower thermal bridge 402 extends into the lower module channel 118 to interface with the pluggable module 106 plugged into the lower module channel 118. The mounting tabs 428 of the frame 420 of the lower thermal bridge 402 are used to mount the lower thermal bridge 402 to the receptacle cage 110. For example, the mounting tabs 428 may be mounted to the first and second side walls 134, 136. When assembled, the lower thermal bridge 402 floats relative to the receptacle cage 110.

In an exemplary embodiment, the receptacle cage 110 includes a side opening 128 in the first side wall 134. The side opening 128 is configured to receive a portion of the thermal transport assembly 200 (FIG. 1). The side opening 128 is aligned with the separator chamber 158 of the port separator 150. The side opening 128 may be located proximate to the front end 140 of the receptacle cage 110. The side opening 128 provides access to the separator chamber 158 and the lower thermal bridge 402 in the port separator 150. In an exemplary embodiment, components of the thermal transport assembly 200 may be side loaded into the port separator 150 and the receptacle cage 110 through the side opening 128.

Figure 8:
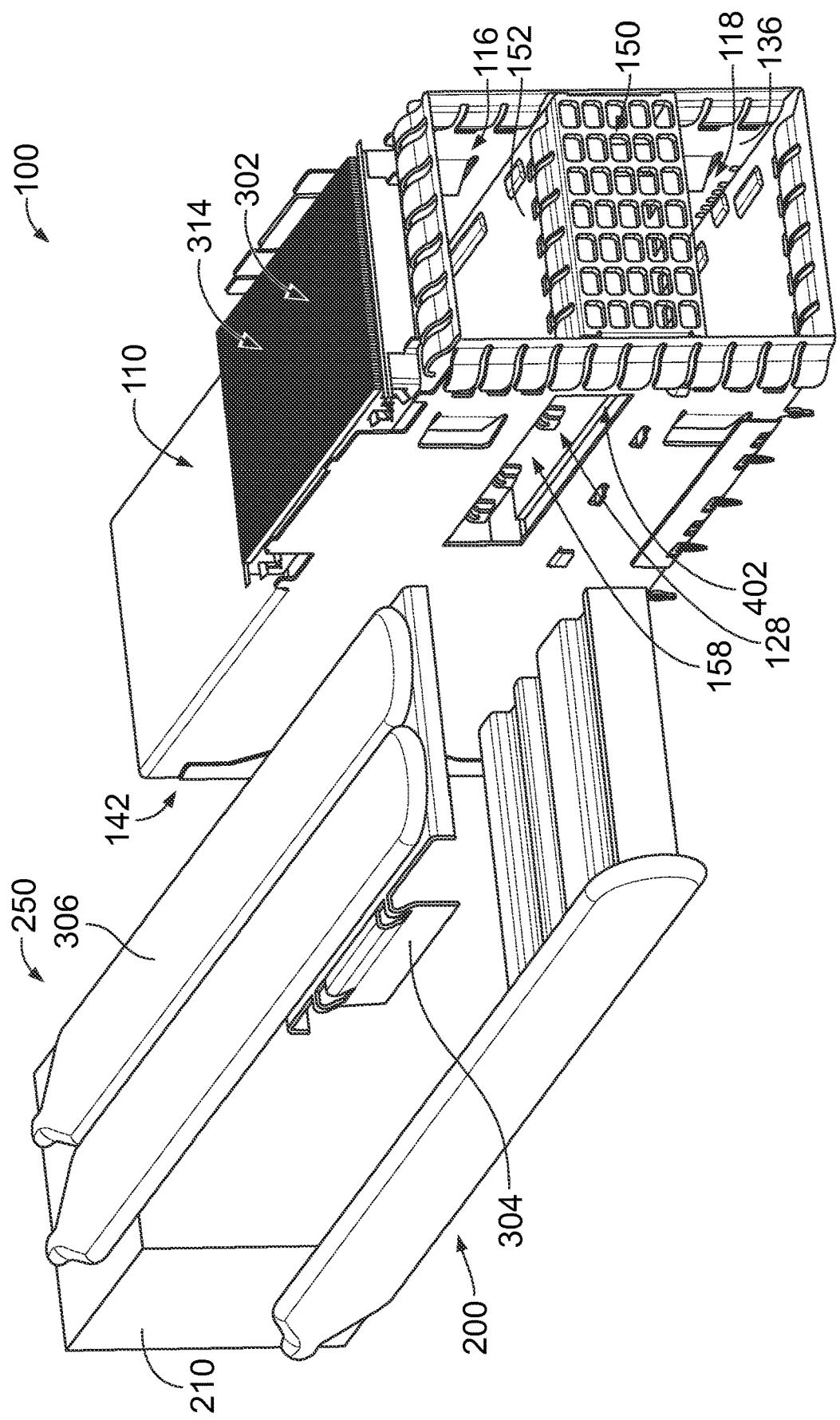
FIG. 8 is a front perspective, left hand view of a portion of the electrical connector assembly in accordance with an exemplary embodiment showing the thermal transport assembly poised for coupling to the receptacle cage.
Figure 9:
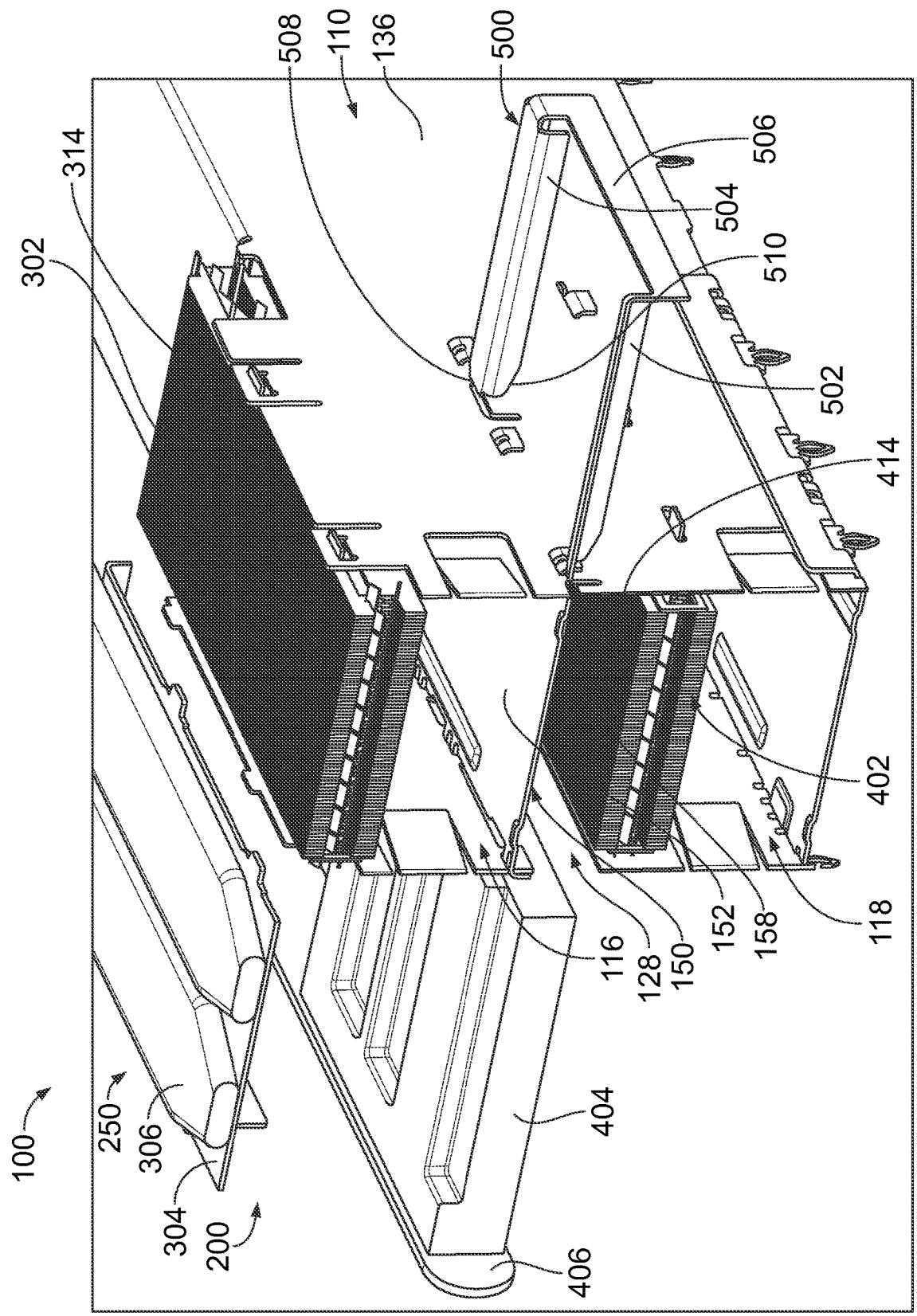
FIG. 9 is a front perspective, partial sectional view of a portion of the electrical connector assembly in accordance with an exemplary embodiment showing a portion of the thermal transport assembly poised for coupling to the receptacle cage.

FIG. 8 is a front perspective, left hand view of a portion of the electrical connector assembly 100 in accordance with an exemplary embodiment showing the thermal transport assembly 200 poised for coupling to the receptacle cage 110. FIG. 9 is a front perspective, partial sectional view of a portion of the electrical connector assembly 100 in accordance with an exemplary embodiment showing a portion of the thermal transport assembly 200 poised for coupling to the receptacle cage 110.

During assembly, the upper and lower thermal bridges 302, 402 are coupled to the receptacle cage 110 above the upper module channel 116 and the lower module channel 118, respectively. The upper and lower thermal bridges 302, 402 may float relative to the receptacle cage 110 to allow relative movement therebetween. The upper heat spreader 304 and the upper heat pipe 306 may be preassembled to the cold plate 210 and the lower heat spreader 404 and the lower heat pipe 406 may be preassembled to the cold plate 210 to form a removable unit 250 that may be removably coupled to the thermal bridges 302, 402 and the receptacle cage 110.

The removable unit 250 is removably coupled to the thermal bridges 302, 402. In an exemplary embodiment, the removable unit 250 is configured to be side loaded into the receptacle cage 110. For example, the upper heat spreader 304 is configured to be side loaded into a position vertically above the upper thermal bridge 302 and the lower heat spreader 404 is configured to be side loaded into a position vertically above the lower thermal bridge 402. The lower heat spreader 404 is configured to be side loaded through the side opening 128 into the separator chamber 158 of the port separator 150. As such, the removable unit 250 may be coupled to the receptacle cage 110 after the receptacle cage 110 is mounted to the host circuit board 102 over the communication connector 112. For example, because the removable unit 250 is unable to be rear loaded into position due to the communication connector 112 at the rear end 142 of the receptacle cage 110, the removable unit 250 is instead side loaded into position for thermal connection to the upper and lower thermal bridges 302, 402.

In an exemplary embodiment, thermal grease is provided on the upper interfaces 314, 414 of the thermal bridges 302, 402 and/or on the bottom surfaces of the heat spreaders 304, 404. To avoid wiping off the thermal grease as the removable unit 250 is loaded into position, the heat spreaders 304, 404 are side loaded at the elevated positions relative to the thermal bridges 302, 402. For example, slight gaps are provided between the heat spreaders 304, 404 and the thermal bridges 302, 402 during loading. Once vertically aligned, the heat spreaders 304, 404 may be compressed downward into thermal engagement with the thermal bridges 302, 402 without detrimentally wiping off the thermal grease.

In an exemplary embodiment, the thermal transport assembly 200 includes a lower compressor 500 (FIG. 9) configured to be coupled to the receptacle cage 110 and the lower heat spreader 404 to compress the lower heat spreader 404 in a vertically downward compression direction toward the lower thermal bridge 402. In an exemplary embodiment, the lower compressor 500 is side loaded into the receptacle cage 110 through the second side wall 136, such as through openings or slots formed in the second side wall 136. The lower compressor 500 may be received in the separator chamber 158, such as along the lower surface of the upper separator wall 152. The lower compressor 500 is coupled to the receptacle cage 110 after the lower heat spreader 404 is positioned in the separator chamber 158 directly vertically above the lower thermal bridge 402.

In the illustrated embodiment, the lower compressor 500 includes a front compression arm 502 and a rear compression arm 504. A connecting beam 506 extends between the front compression arm 502 and the rear compression arm 504. Any number of compression arms may be used in alternative embodiments. The compression arms 502, 504 are configured to engage the top surface of the lower heat spreader 404 to press the lower heat spreader 404 in the compression direction. In an exemplary embodiment, the distal ends 508 of the compression arms 502, 504 include ramp surfaces 510. The ramp surfaces 510 guide mating with the lower heat spreader 404 and force the compression of the lower heat spreader 404 as the compression arms 502, 504 are loaded into the receptacle cage 110. Other types of compression devices may be used in alternative embodiments.

Figure 10:
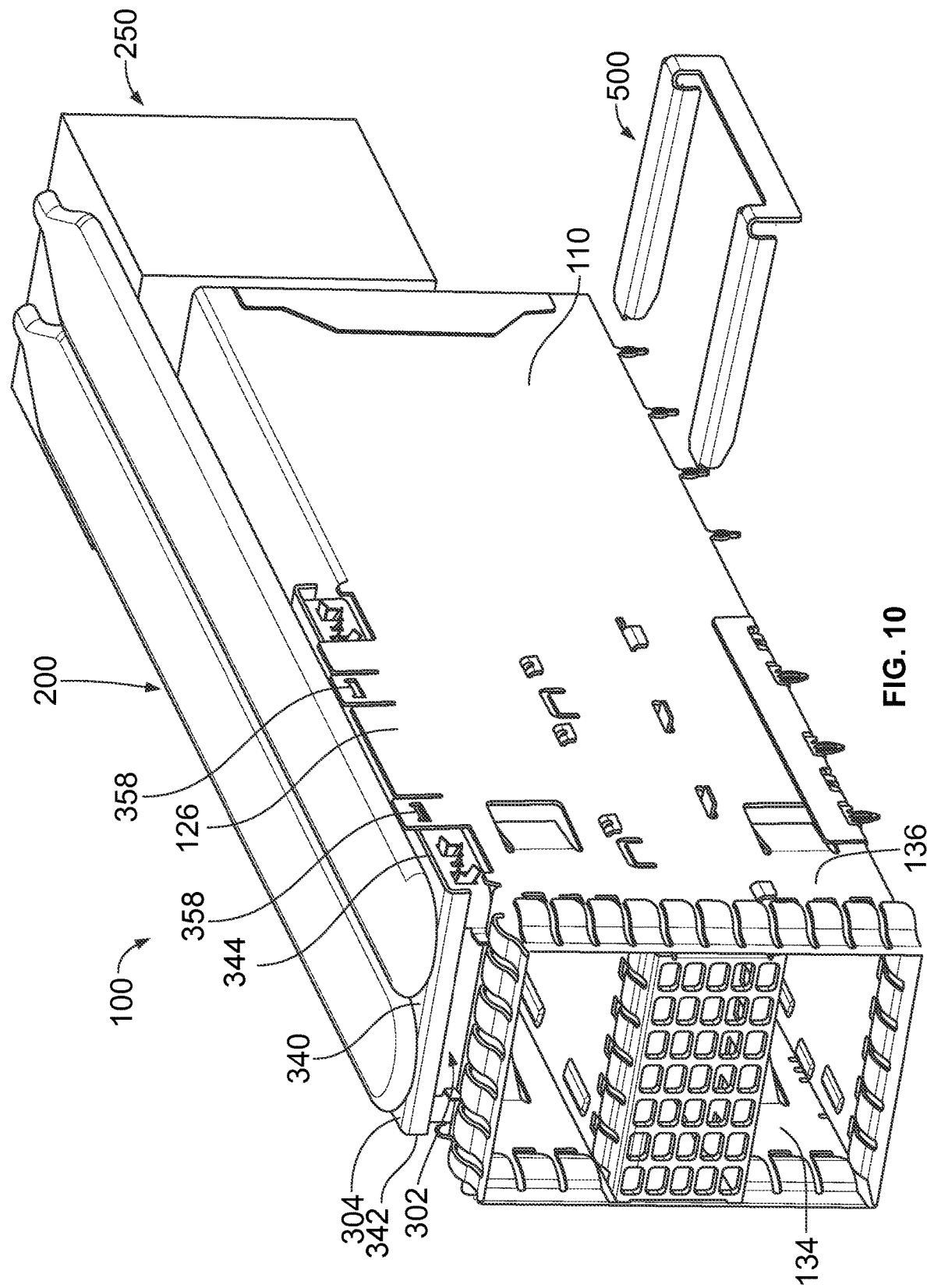
FIG. 10 is a front perspective, right hand view of a portion of the electrical connector assembly in accordance with an exemplary embodiment showing the thermal transport assembly coupled to the receptacle cage.
Figure 11:
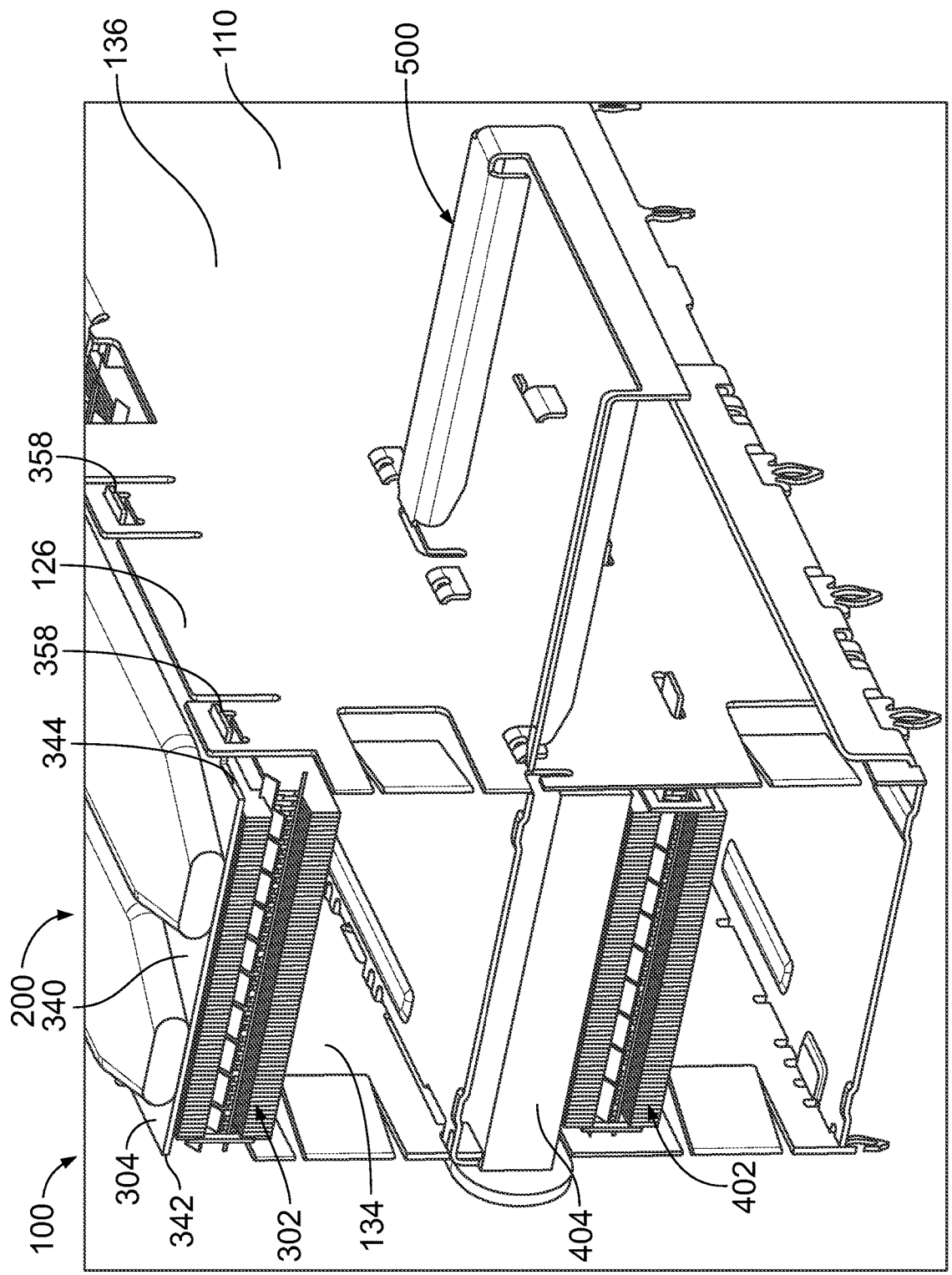
FIG. 11 is a front perspective, partial sectional view of a portion of the electrical connector assembly in accordance with an exemplary embodiment showing a portion of the thermal transport assembly coupled to the receptacle cage.
Figure 12:
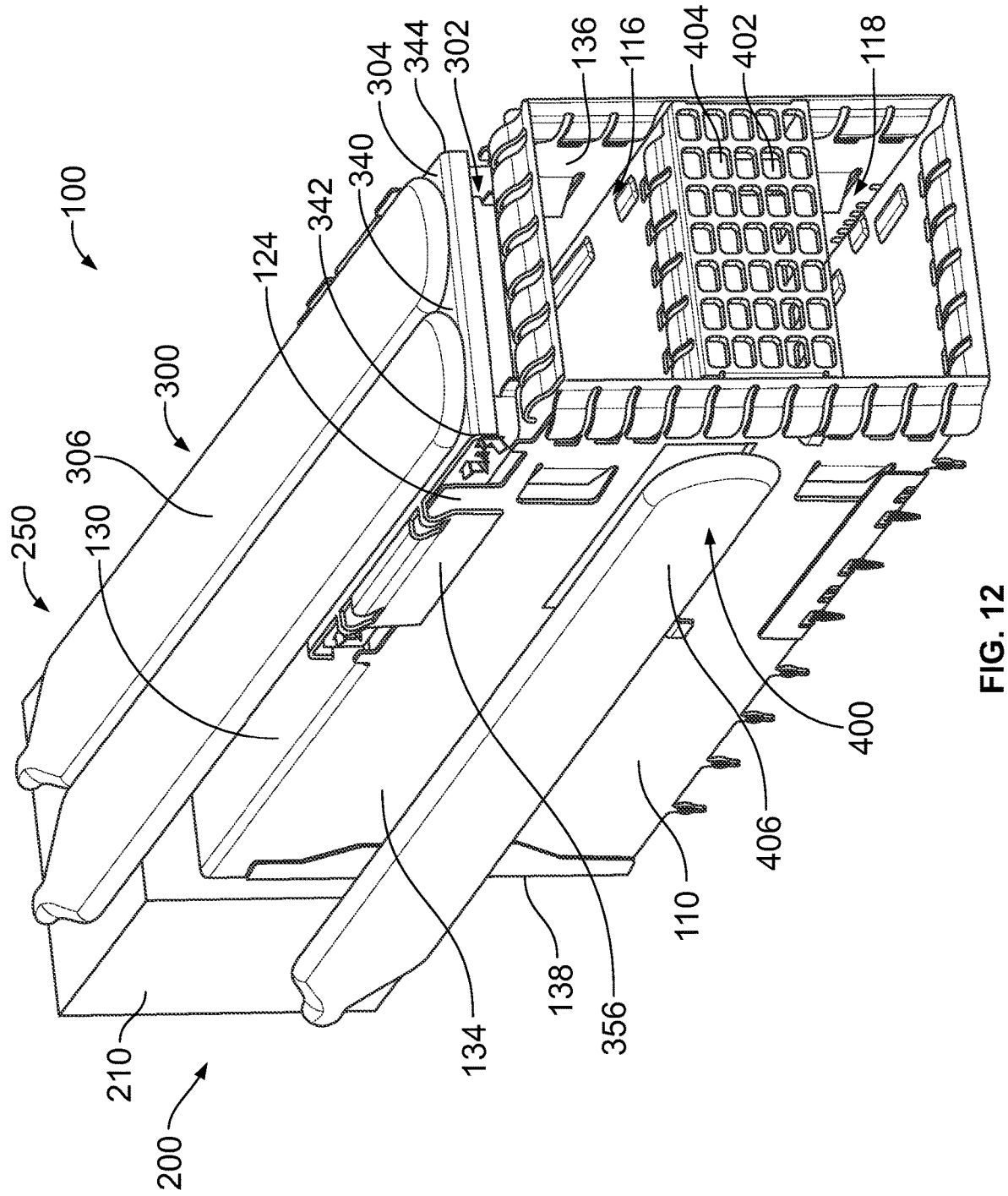
FIG. 12 is a front perspective, left hand view of a portion of the electrical connector assembly in accordance with an exemplary embodiment showing the thermal transport assembly coupled to the receptacle cage.

FIG. 10 is a front perspective, right hand view of a portion of the electrical connector assembly 100 in accordance with an exemplary embodiment showing the thermal transport assembly 200 coupled to the receptacle cage 110. FIG. 11 is a front perspective, partial sectional view of a portion of the electrical connector assembly 100 in accordance with an exemplary embodiment showing a portion of the thermal transport assembly 200 coupled to the receptacle cage 110. FIG. 12 is a front perspective, left hand view of a portion of the electrical connector assembly 100 in accordance with an exemplary embodiment showing the thermal transport assembly 200 coupled to the receptacle cage 110.

During assembly, after the removable unit 250 is moved to the loaded position with the upper and lower heat spreaders 304, 404 aligned above the upper and lower thermal bridges 302, 402, the removable unit 250 may be coupled to the receptacle cage 110 to complete assembly. For example, the load compressor 500 may be coupled to the receptacle cage 110 to compress the lower heat spreader 404 downward into thermal contact with the lower thermal bridge 402. The upper heat spreader 304 may be coupled to the support walls 124, 126. In an exemplary embodiment, one or more first mounting tabs 356 (FIG. 12) extending from the first side 342 of the main body 340 of the heat spreader 304 may be coupled to the first side wall 134. For example, the first mounting tab 356 may be clipped or latched to the first side wall 134. In other embodiments, the first mounting tab 356 may be welded to the first side wall 134. In an exemplary embodiment, one or more second mounting tabs 358 (FIG. 10) extending from the second side 344 of the main body 340 may be received in openings in the support wall 126 to secure the upper heat spreader 304 to the second side wall 136. The mounting tabs 356, 358 may hold the upper heat spreader 304 in a compressed position in thermal contact with the upper thermal bridge 302.

Figure 13:
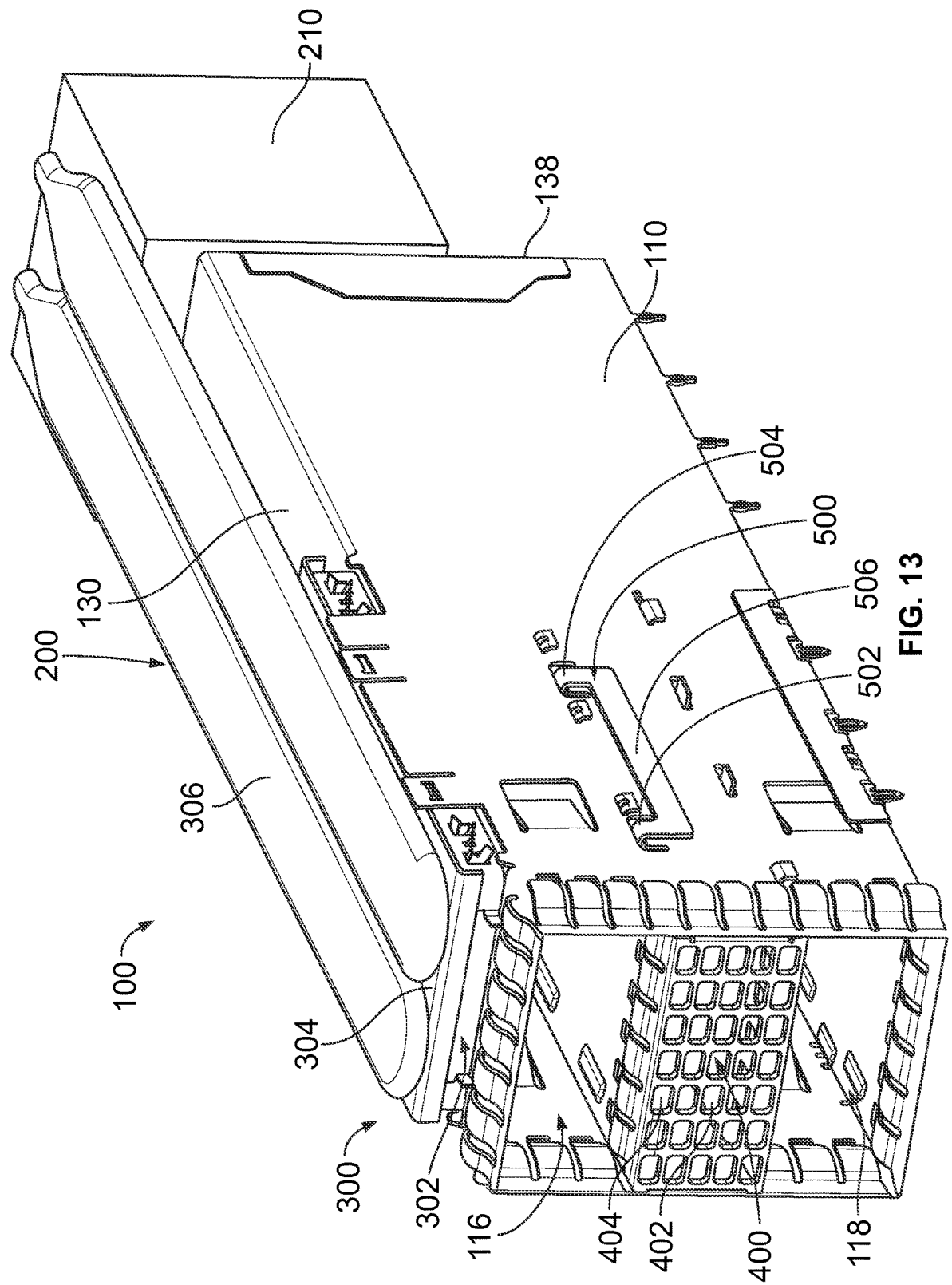
FIG. 13 is a front perspective, right hand view of a portion of the electrical connector assembly in accordance with an exemplary embodiment showing the thermal transport assembly coupled to the receptacle cage.

FIG. 13 is a front perspective, right hand view of a portion of the electrical connector assembly 100 in accordance with an exemplary embodiment showing the thermal transport assembly 200 coupled to the receptacle cage 110. FIG. 13 illustrates the lower compressor 500 coupled to the receptacle cage 110. The lower compressor 500 may be side loaded into the receptacle cage 110 until the connecting beam 506 is pressed against the exterior of the receptacle cage 110. The compression arms 502, 504 of the lower compressor 500 press the lower heat spreader 404 downward into thermal engagement with the lower thermal bridge 402.

With reference to FIGS. 12 and 13, the thermal transport assembly 200 is used to dissipate heat from the pluggable modules 106 received in the module channels 116, 118 and transport the heat to the cold plate 210 for efficient heat dissipation from the pluggable modules 106. The upper cooling module 300 efficiently cools the upper pluggable module 106 while the lower cooling module 400 efficiently cools the lower pluggable module 106. The heat is drawn away from the pluggable modules 106 in the module channels 116, 118 to the exterior of the receptacle cage 110.

The upper thermal bridge 302 is configured to interface with the upper pluggable module 106 to draw heat out of the upper pluggable module 106. The upper heat spreader 304 receives the heat from the upper thermal bridge 302 and transfers the heat to the upper heat pipes 306. The upper heat pipes 306 extend along the exterior of the receptacle cage 110, such as along the top wall 130 to the cold plate 210, which is located rearward of the rear wall 138 of the receptacle cage 110. The cold plate 210 may have a width approximately equal to the width of the receptacle cage 110 so as to not impact the overall width of the electrical connector assembly 100. Other components may be mounted to the right and/or the left of the electrical connector assembly 100 without impact by the cold plate 210. The upper heat pipes 306 and the upper heat spreader 304 are short to maintain a low-profile for the electrical connector assembly 100. As such, other components may be located above the electrical connector assembly 100. For example, the electrical connector assembly 100 may be usable within a server rack having multiple racks stacked on top of each other within the server rack. The electrical connector assembly 100 may fit within a 1U height requirement.

The lower thermal bridge 402 is configured to interface with the lower pluggable module 106 to draw heat out of the lower pluggable module 106. The lower heat spreader 404 receives the heat from the lower thermal bridge 402 and transfers the heat to the lower heat pipe 406. The lower heat pipe 406 extends along the exterior of the receptacle cage 110, such as along the side wall 134 to the cold plate 210 at the rear of the receptacle cage 110. The lower heat pipe 306 is narrow so as to not detrimentally impact the overall width of the electrical connector assembly 100. For example, the lower heat pipe 306 may add less than 10% to the overall width of the electrical connector assembly 100. In various embodiments, the lower heat pipe 306 may add less than 25% of the overall width of the electrical connector assembly 100.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A receptacle assembly comprising:
   a receptacle cage including cage walls forming a cavity, the cage walls including a top wall, a first side wall, and a second side wall, the receptacle cage extending between a front and a rear, the receptacle cage including a channel separator received in the cavity between the first and second side walls, the channel separator including an upper separator wall and a lower separator wall with a separator chamber between the upper and lower separator walls, the channel separator separating the cavity into an upper module channel configured to receive an upper pluggable module and a lower module channel configured to receive a lower pluggable module, the top wall including a top opening providing access to the upper module channel, the lower separator wall including a lower opening providing access to the lower module channel, the first side wall including a side opening aligned with the separator chamber; and
   a thermal transport assembly coupled to the receptacle cage, the thermal transport assembly including an upper cooling module, a lower cooling module and a cold plate at the rear of the receptacle cage, the upper cooling module being located in the top opening, the upper cooling module thermally coupled to the cold plate and configured to be thermally coupled to the upper pluggable module plugged into the upper module chamber, the lower cooling module being located in the separator chamber, the lower cooling module being loaded into the separator chamber, the lower cooling module thermally coupled to the cold plate and configured to be thermally coupled to the lower pluggable module plugged into the lower module chamber.

2. The receptacle assembly of claim 1, wherein the upper and lower cooling modules are configured to be vertically compressed into thermal engagement with the upper and lower pluggable modules.

3. The receptacle assembly of claim 1, wherein the cold plate is liquid cooled.

4. The receptacle assembly of claim 1, wherein the thermal transport assembly includes floating portions that float relative to the receptacle cage and removable portions removably coupled to the floating portions.

5. The receptacle assembly of claim 4, wherein:
   the floating portions include an upper thermal bridge and a lower thermal bridge, the upper thermal bridge forming a portion of the upper cooling module, the upper thermal bridge coupled to the cage walls and located in the top opening, the lower thermal bridge forming a portion of the lower cooling module, the lower thermal bridge coupled to the cage walls and located within the separator chamber; and
   the removable portions include an upper heat spreader and an upper heat pipe forming portions of the upper cooling module and a lower heat spreader and a lower heat pipe forming portions of the lower cooling module, the upper heat spreader being thermally coupled to an upper interface of the upper thermal bridge, the upper heat pipe being thermally coupled between the upper heat spreader and the cold plate to dissipate heat from the upper heat spreader to the cold plate, the lower heat spreader being thermally coupled to an upper interface of the lower thermal bridge, the lower heat pipe being thermally coupled between the lower heat spreader and the cold plate to dissipate heat from the lower heat spreader to the cold plate.

6. The receptacle assembly of claim 5, wherein the lower heat spreader is side loaded into the separator chamber through the side opening into position directly above the lower thermal bridge, the lower heat spreader being compression loaded downward to engage and compress against the upper interface of the lower thermal bridge.

7. The receptacle assembly of claim 1, wherein:
   the upper cooling module includes an upper thermal bridge, an upper heat spreader, and an upper heat pipe, the upper thermal bridge including an upper interface and a lower interface, the lower interface of the upper thermal bridge configured to face and thermally couple to the pluggable module, the upper heat spreader being thermally coupled to the upper interface of the upper thermal bridge, the upper heat pipe thermally coupled between the upper heat spreader and the cold plate to dissipate heat from the upper heat spreader to the cold plate, the upper thermal bridge being located in the top opening to interface with the upper pluggable module in the upper module chamber; and
   the lower cooling module including a lower thermal bridge, a lower heat spreader, and a lower heat pipe, the lower thermal bridge including an upper interface and a lower interface, the lower interface of the lower thermal bridge configured to face and thermally couple to the pluggable module, the lower heat spreader being thermally coupled to the upper interface of the lower thermal bridge, the lower heat pipe thermally coupled between the lower heat spreader and the cold plate to dissipate heat from the lower heat spreader to the cold plate, the lower thermal bridge being located in the separator chamber to interface with the lower pluggable module in the lower module chamber, the lower heat spreader passing through the side opening to the separator chamber to interface with the lower thermal bridge.

8. The receptacle assembly of claim 7, further comprising a lower compressor coupled to the receptacle cage, the lower compressor engaging the lower heat spreader and pressing downward on the lower heat spreader to compress the lower thermal bridge into thermal engagement with the lower pluggable module plugged into the lower module chamber.

9. The receptacle assembly of claim 7, wherein the lower thermal bridge includes thermal grease applied to the upper interface of the lower thermal bridge, the lower heat spreader being vertically mated to the thermal grease at the upper interface of the lower thermal bridge.

10. The receptacle assembly of claim 7, wherein the upper heat spreader has a width approximately equal to a width of the upper module channel, a first side of the upper heat spreader being coupled to the first side wall, a second side of the upper heat spreader being coupled to the second side wall, and wherein the lower heat spreader has a width approximately equal to a width of the separator chamber such that the lower heat spreader substantially fills the separator chamber between the first side wall and the second side wall.

11. The receptacle assembly of claim 7, wherein the upper heat pipe extends along an exterior of the top wall between the upper heat spreader and the cold plate, the lower heat pipe extending along an exterior of the first side wall between the lower heat spreader and the cold plate.

12. The receptacle assembly of claim 7, wherein the upper thermal bridge includes a plurality of upper plates arranged in an upper plate stack, the upper plates being movable relative to each other, the upper plates being compressible between the upper heat spreader and the upper pluggable module, and wherein the lower thermal bridge includes a plurality of lower plates arranged in a lower plate stack, the lower plates being movable relative to each other, the lower plates being compressible between the lower heat spreader and the lower pluggable module.

13. A receptacle assembly comprising:
a receptacle cage including cage walls forming a cavity, the cage walls including a top wall, a first side wall, and a second side wall, the receptacle cage extending between a front and a rear, the receptacle cage including a channel separator received in the cavity between the first and second side walls, the channel separator including an upper separator wall and a lower separator wall with a separator chamber between the upper and lower separator walls, the channel separator separating the cavity into an upper module channel configured to receive an upper pluggable module and a lower module channel configured to receive a lower pluggable module, the top wall including a top opening providing access to the upper module channel, the lower separator wall including a lower opening providing access to the lower module channel, the first side wall including a side opening aligned with the separator chamber;
a thermal transport assembly coupled to the receptacle cage, the thermal transport assembly including an upper cooling module, a lower cooling module and a cold plate at the rear of the receptacle cage;
the upper cooling module including an upper thermal bridge, an upper heat spreader, and an upper heat pipe, the upper thermal bridge including an upper interface and a lower interface, the lower interface of the upper thermal bridge configured to face and thermally couple to the pluggable module, the upper heat spreader being thermally coupled to the upper interface of the upper thermal bridge, the upper heat pipe thermally coupled between the upper heat spreader and the cold plate to dissipate heat from the upper heat spreader to the cold plate, the upper thermal bridge being located in the top opening to interface with the upper pluggable module in the upper module chamber; and
the lower cooling module including a lower thermal bridge, a lower heat spreader, and a lower heat pipe, the lower thermal bridge including an upper interface and a lower interface, the lower interface of the lower thermal bridge configured to face and thermally couple to the pluggable module, the lower heat spreader being thermally coupled to the upper interface of the lower thermal bridge, the lower heat pipe thermally coupled between the lower heat spreader and the cold plate to dissipate heat from the lower heat spreader to the cold plate, the lower thermal bridge being located in the separator chamber to interface with the lower pluggable module in the lower module chamber, the lower heat spreader passing through the side opening to the separator chamber to interface with the lower thermal bridge.

14. The receptacle assembly of claim 13, further comprising a lower compressor coupled to the receptacle cage, the lower compressor engaging the lower heat spreader and pressing downward on the lower heat spreader to compress the lower thermal bridge into thermal engagement with the lower pluggable module plugged into the lower module chamber.

15. The receptacle assembly of claim 13, wherein the lower thermal bridge includes thermal grease applied to the upper interface of the lower thermal bridge, the lower heat spreader being vertically mated to the thermal grease at the upper interface of the lower thermal bridge.

16. The receptacle assembly of claim 13, wherein the upper heat spreader has a width approximately equal to a width of the upper module channel, a first side of the upper heat spreader being coupled to the first side wall, a second side of the upper heat spreader being coupled to the second side wall, and wherein the lower heat spreader has a width approximately equal to a width of the separator chamber such that the lower heat spreader substantially fills the separator chamber between the first side wall and the second side wall.

17. The receptacle assembly of claim 13, wherein the upper heat pipe extends along an exterior of the top wall between the upper heat spreader and the cold plate, the lower heat pipe extending along an exterior of the first side wall between the lower heat spreader and the cold plate.

18. The receptacle assembly of claim 13, wherein the upper thermal bridge includes a plurality of upper plates arranged in an upper plate stack, the upper plates being movable relative to each other, the upper plates being compressible between the upper heat spreader and the upper pluggable module, and wherein the lower thermal bridge includes a plurality of lower plates arranged in a lower plate stack, the lower plates being movable relative to each other, the lower plates being compressible between the lower heat spreader and the lower pluggable module.

19. A receptacle assembly comprising:
a receptacle cage including cage walls forming a cavity, the cage walls including a top wall, a first side wall, and a second side wall, the receptacle cage extending between a front and a rear, the receptacle cage including a channel separator received in the cavity between the first and second side walls, the channel separator including an upper separator wall and a lower separator wall with a separator chamber between the upper and lower separator walls, the channel separator separating the cavity into an upper module channel configured to receive an upper pluggable module and a lower module channel configured to receive a lower pluggable module;
a thermal transport assembly coupled to the receptacle cage, the thermal transport assembly including an upper cooling module, a lower cooling module and a cold plate at the rear of the receptacle cage, the upper cooling module thermally coupled to the cold plate and configured to be thermally coupled to the upper pluggable module plugged into the upper module chamber, the lower cooling module extending into the separator chamber through an opening in a side wall, the lower cooling module thermally coupled to the cold plate; and
a lower compressor coupled to the receptacle cage, the lower compressor engaging the lower cooling module and pressing downward on the lower cooling module to compress the lower cooling module into thermal engagement with the lower pluggable module plugged into the lower module chamber.

20. The receptacle assembly of claim 19, wherein:
the upper cooling module includes an upper thermal bridge, an upper heat spreader, and an upper heat pipe, the upper thermal bridge including an upper interface and a lower interface, the lower interface of the upper thermal bridge configured to face and thermally couple to the pluggable module, the upper heat spreader being thermally coupled to the upper interface of the upper thermal bridge, the upper heat pipe thermally coupled between the upper heat spreader and the cold plate to dissipate heat from the upper heat spreader to the cold plate, the upper thermal bridge being located in the top opening to interface with the upper pluggable module in the upper module chamber; and
the lower cooling module including a lower thermal bridge, a lower heat spreader, and a lower heat pipe, the lower thermal bridge including an upper interface and a lower interface, the lower interface of the lower thermal bridge configured to face and thermally couple to the pluggable module, the lower heat spreader being thermally coupled to the upper interface of the lower thermal bridge, the lower heat pipe thermally coupled between the lower heat spreader and the cold plate to dissipate heat from the lower heat spreader to the cold plate, the lower thermal bridge being located in the separator chamber to interface with the lower pluggable module in the lower module chamber, the lower heat spreader passing through the side opening to the separator chamber to interface with the lower thermal bridge.

* * * * *